United States Patent [19]

Metcalfe et al.

[11] 4,293,147

[45] Oct. 6, 1981

[54] METHOD AND APPARATUS FOR SECURING A PIPE TO A FITTING

[75] Inventors: Ronald S. Metcalfe, Sale; John M. Greig, Whitley Bay, both of England

[73] Assignees: RM Fabircations Limited, Skelmersdale; British Gas Corporation, London, both of England

[21] Appl. No.: 26,138

[22] Filed: Mar. 30, 1979

[30] Foreign Application Priority Data

Mar. 31, 1978 [GB] United Kingdom ............... 12782/78

[51] Int. Cl.³ .......................................... F16L 35/00
[52] U.S. Cl. ..................................... 285/39; 285/242; 285/259; 29/237; 29/506; 29/525
[58] Field of Search ................... 285/39, 242, 255, 256, 285/259; 29/506, 507, 508, 237, 520, 525

[56] References Cited

U.S. PATENT DOCUMENTS

| 2,230,115 | 1/1941 | Kreidel ............................. 285/259 X |
| 3,222,091 | 12/1965 | Marshall ........................... 285/255 X |
| 3,257,132 | 6/1966 | Lyons ............................... 285/259 X |
| 3,408,099 | 10/1968 | Appleton ........................... 285/259 X |
| 3,599,310 | 8/1971 | Browniee ........................... 29/237 |
| 3,978,572 | 9/1976 | Jackman ............................ 29/237 |

FOREIGN PATENT DOCUMENTS

| 220055 | 8/1957 | Australia ............................. 285/242 |
| 1146247 | 3/1963 | Fed. Rep. of Germany ........ 29/237 |
| 1164784 | 5/1958 | France .................................. 29/237 |
| 793224 | 4/1958 | United Kingdom ............... 285/242 |
| 915051 | 1/1963 | United Kingdom . |
| 1006329 | 9/1965 | United Kingdom . |
| 1245188 | 9/1971 | United Kingdom . |
| 1266535 | 3/1972 | United Kingdom . |
| 1408608 | 10/1975 | United Kingdom . |
| 1424384 | 2/1976 | United Kingdom . |
| 1428583 | 3/1976 | United Kingdom . |
| 1428512 | 3/1976 | United Kingdom . |
| 1434642 | 5/1976 | United Kingdom . |
| 1492547 | 11/1977 | United Kingdom . |
| 1506787 | 4/1978 | United Kingdom . |

Primary Examiner—Dave W. Arola
Attorney, Agent, or Firm—Sughrue, Mion, Zinn, Macpeak and Seas

[57] ABSTRACT

A method for connecting a plastics pipe to a fitting incorporating an externally grooved insert. The insert, which is a tight fit in the pipe, is forced into the end of the pipe, and a sleeve, previously located on the pipe, is then forced to the end of the pipe so that the pipe end is tightly gripped between the insert and the sleeve. The insert is tubular and is provided with a plurality of circumferential grooves in its outer surface. Each groove has in axial section substantially straight sides and a straight base, the angle between the base and each side being obtuse. Insertion of the insert causes the external diameter of the pipe to increase so as to be greater than the internal diameter of the sleeve.

2 Claims, 6 Drawing Figures

METHOD AND APPARATUS FOR SECURING A PIPE TO A FITTING

The present invention relates to a method for connecting a pipe to a fitting and an insert and coupling for use in accordance with the method.

Plastics pipes are now widely used in for example fuel gas distribution networks and it is necessary to make reliable pipe-to-pipe and pipe-to-appliance connections. These connections must not only be leakproof but also must be sufficiently strong to prevent the end of the pipe being pulled loose. As the plastics pipe is at least slightly deformable and its end is smooth difficulties have been experienced in obtaining connections of adequate strength.

Various systems have been proposed for connecting pipes in which sealing of the connection is achieved by compressing a resilient member against the outer surface of the pipe. An example is described in British patent specification No. 1,167,780. Unfortunately the outer surface of the pipe is often scored accidentally for example in transit or when the pipe is being laid and cut to length and leakages can result.

British patent specification No. 1,523,961 describes a pipe coupling which comprises an insert for insertion into the end of a pipe, a member having a tubular portion for reception of a pipe end containing the insert, and a sleeve for engagement about the tubular portion to trap the pipe between the tubular portion and the insert. This three element coupling (i.e. insert, member and sleeve) may be used to connect plastics pipes and when so used it is known to externally groove the insert to enhance the grip of the insert within the pipe. As described in specification No. 1,523,961 however, if all the grooves are shaped such that the surface of the insert is serrated, there is a tendency for the pipe to crack in use. To overcome this problem specification No. 1,523,961 proposes a coupliing in which the insert is provided with two axially spaced sets of grooves, one set adjacent the end of the coupling comprising arcuate cross-section annular grooves and the other comprising straight sided and straight bottomed annular grooves. Each straight side of the said other set of grooves which faces away from the end of the coupling extends substantially perpendicular to the base of the groove and the coupling axis to give a serrated longitudinal section. It is thought that this arrangement of two sets of grooves permits a small axial movement of the pipe relative to the coupling and thereby avoids cracking of the pipe.

It has now surprisingly been discovered that a satisfactory two-part coupling can be provided which avoids the problems and complexity of the prior art.

According to the present invention there is provided a method for connecting a plastics pipe to a fitting incorporating an externally grooved insert, the insert being a tight fit in the pipe, characterized in that a sleeve is pushed onto the pipe and away from the pipe end, the insert is forced into the end of the pipe, and the sleeve is forced to the end of the pipe so that the pipe end is tightly gripped between the insert and the sleeve.

The insert used in accordance with the above method is tubular and preferably is provided with a plurality of circumferential grooves in its outer surface, characterized in that each groove has in axial section substantially straight sides and a straight base, the angle between the base and each side being obtuse. A pipe coupling for use with the above insert preferably comprises a sleeve for engagement around a pipe into which the insert has been inserted, characterised in that the insert is a tight fit in the pipe such that its insertion causes the external diameter of the pipe to increase, and the internal diameter of the sleeve is at least as great as the external diameter of the pipe in its free state but less than the external diameter of the pipe after insertion of the insert.

Embodiments of the present invention will now be described, by way of example, with reference to the accompanying drawings; in which FIG. 1 illustrates a clamp for use in making a connection between a small diameter pipe and a mating fitting in accordance with the present invention;

Figure 1:
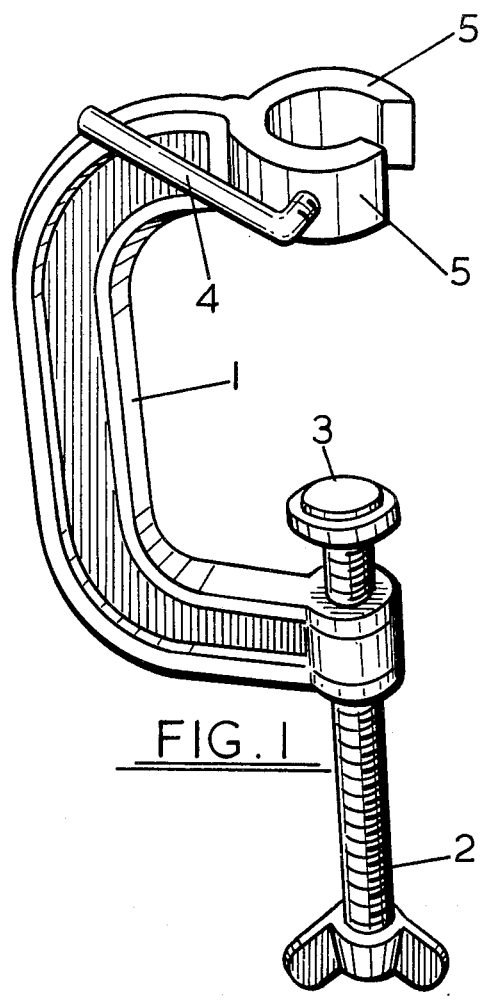
Figure 2:
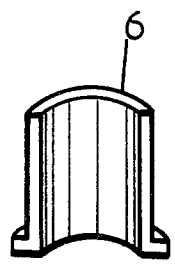
FIG. 2 illustrates a half shell adapted for use with the clamp of FIG. 1.

Referring to FIGS. 1 and 2, a C-clamp 1 receives a threaded bolt 2 on the end of which a spigot 3 is rotatably supported and a threaded lever 4 which may be rotated to protrude inside a C-shaped housing defined by limbs 5. Two half shells 6 one of which is shown in FIG. 2 may be located between the limbs 5 and may be forced together by turning the lever 4.

Figure 3:
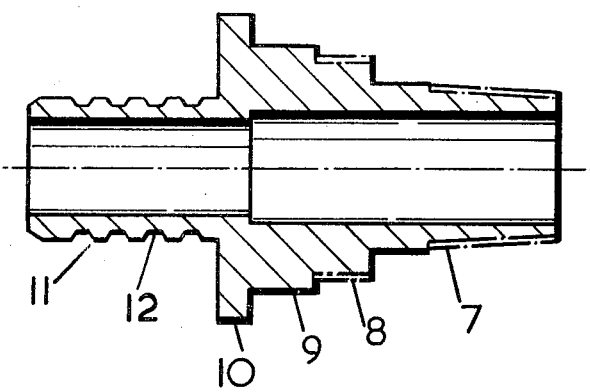
FIG. 3 shows in section a fitting having an integral insert in accordance with the present invention.

Referring now to FIG. 3, the illustrated fitting comprises a threaded end 7, a threaded intermediate portion 8, a shoulder 9 and a flange 10. An insert 11 is integral with the flange 10. The insert 11 is provided with circumferential grooves 12. The grooves 12 are trapezoidal in longitudinal section as shown, i.e. each groove comprises two straight sides and a straight base, with the angle between the base and each side being obtuse.

Figure 4:
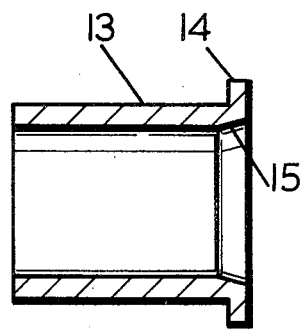
FIG. 4 shows in section a sleeve for use with the fitting of FIG. 3.

Referring to FIG. 4, the illustrated sleeve comprises a tubular body 13 supporting a flange 14 at one end, the inner edge 15 of the flange being chamfered.

In use, a pipe can be secured to the fitting of FIG. 3 using the clamp of FIG. 1 by slipping the sleeve of FIG. 4 over and beyond the pipe end with the flange 14 facing the end of the pipe, placing two half shells (FIG. 2) around the pipe end, inserting the pipe end and half shells between limbs 5 of the clamp (FIG. 1), and tightening the half shells by turning lever 4. The lever 4, limbs 5 and half shells 6 thus form a first clamp element. The fitting of FIG. 3 is then supported in the clamp with the insert 11 adjacent to and coaxial with the gripped pipe and its threaded end 7 bearing against the spigot 3 (FIG. 1). The spigot 3 thus forms a second clamp element. The screw 2 is then turned so that the first and second clamp elements are moved towards each other and the insert 11 is forced into the end of the pipe. As a result the external diameter of the pipe increases to exceed the internal diameter of the sleeve (FIG. 4).

Thereafter the screw 2 is loosened, the half shells 6 are released by turning lever 4 and removed from between the limbs 5, and the pipe is passed through the gap between the limbs 5. The sleeve is then gripped in the clamp and pushed down into contact with the flange 10 so that the pipe is firmly gripped between the insert 11 and the body 13 of the sleeve. The sleeve is positioned with the assistance of the clamp of FIG. 1 as it is a tight fit over the pipe end after insertion of the insert 11. The sleeve is sufficiently tight to force the tube into the grooves 12 in the tubular extension to give a gas tight connection. The chamfered edge 15 of the collar facilitates pushing the collar over the pipe and tubular extension.

The connected fitting and pipe may be secured to an appliance, e.g. a meter box, by passing the threaded end 7 of the fitting through a suitable aperture so that the flange 10 bears against the edge of the aperture. A nut (not shown) can then be screwed onto the threaded portion 8 so that the wall of the box is gripped between the nut and the flange 10. The pipe is then secured to the meter box in a visually neat manner. A resilient washer may be interposed between the fitting and the meter box wall if desired.

The application of the present invention to the making of connections to large diameter pipes will now be described with reference to FIG. 5.

Figure 6:
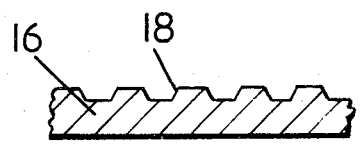
Figure 5:
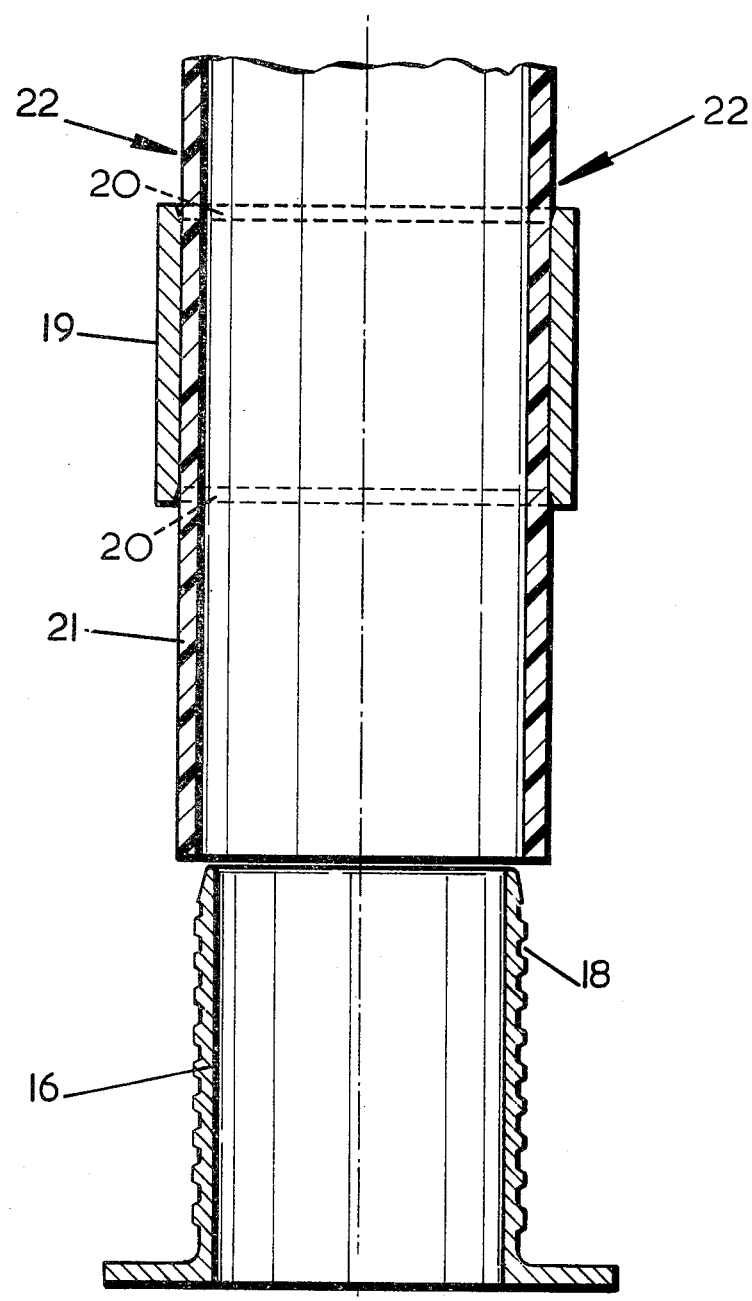
FIG. 5 shows in section an insert, a pipe and a sleeve which may be used to make a joint in accordance with the method of the invention; and, FIG. 6 shows an axial section through a portion of the insert shown in FIG. 5.

FIG. 5 shows an insert 16 integral with a flange 17 for securing to a fabricated steel connector (not shown). The external surface of the insert is provided with circumferential grooves 18 which as shown in FIG. 6 are trapezoidal in axial section.

FIG. 5 also shows a simple tubular sleeve 19 the radially inner edges 20 of the ends of which are chamfered to make it easier for the sleeve to slide over a plastics tube.

In use, the flange 17 is secured in a first element of a clamp (not shown) and the end of a plastics pipe 21 is positioned adjacent the tapering end of the insert 16, the sleeve 19 having been already positioned around the pipe 21 as shown. The pipe 21 is then gripped by a second element of the same clamp in the region indicated by arrows 22 so that the sleeve 19 is located between the gripping point of the clamp on the pipe and the end of the pipe.

A hydraulic ram (not shown) is then actuated to move the two clamp elements towards each other, thereby forcing the pipe 21 over the insert 16. When the insert 16 is fully inserted into the pipe 21, the grip of the second clamp element on the pipe 21 is loosened and the hydraulic ram is again actuated so that the second clamp element slips over the pipe 21, bears on the sleeve 19, and forces the sleeve 19 over the pipe and insert 16. A secure joint is thus formed between the fitting 16 and the pipe 21.

As shown in FIG. 5, at least a part of one of the grooves may be located in the tapered end portion of the insert. This makes it easier to force the insert into the pipe. The insertion of the insert can be further facilitated if the insert is lubricated.

When the insert is pushed fully into the pipe there is a tendency for the pipe end to splay out against the flange. To avoid this, it is possible to provide a further groove adjacent the insert flange which further groove is wider than grooves 18 as shown in FIG. 5. The further groove enables the pipe end to contract thereinto.

Connections formed in accordance with the present invention are advantageous in that a seal is formed on the internal surface of the pipe. The internal surface of the pipe is easier to keep clean and is less likely to be scored so that a more reliable connection can be made than with systems in which the seal is formed on the outer surface of the pipe. Furthermore no O-rings are required. This is important as O-rings tend to get lost and a fitter can easily forget to put them in the connection.

As shown in the illustrated embodiments of the invention the inserts or tubular extensions have grooves therein which in longitudinal section have two straight sides and a straight base, the angle between the base and each side being obtuse. It has been found that this groove shape is easy to produce when compared with the saw-tooth grooves of the prior art, that the avoidance of sharp edges reduces the risk of stress cracks appearing in the pipe, and that a secure, gas-tight engagement between the pipe and the insert is obtained. A good seal is obtained because as the material of the pipe is forced into the grooves it is progressively compressed as it moves towards the groove base, resulting in the formation of good seals against the sides of the grooves. Furthermore, only a relatively small number of grooves is required as, when the plastics pipe is forced into the grooves, the groove width is such that the portion of the pipe inside the groove provides a relatively large area over which any shear stress is distributed.

It will be appreciated that a fitting could be provided for joining two lengths of pipe which fitting would have two coaxial inserts joined by a central flange.

What is claimed is:

1. A method for connecting a plastic pipe to a fitting incorporating an externally grooved insert, the insert being a tight fit in the pipe, comprising pushing a sleeve onto the pipe and away from the pipe end, forcing the insert into the end of the pipe by gripping the pipe in a first element of a clamp, supporting the fitting in a second element of the clamp with the insert coaxial with the end of the gripped pipe, and moving the first and second elements of the clamp towards each other; wherein said sleeve is positioned on the pipe between said first and second elements of the clamp, and thereafter forcing the sleeve to the end of the pipe by releasing the grip of the first clamp element on the pipe, and again moving said first and second clamp elements towards each other such that the first clamp element slides along the pipe, engages the sleeve and pushes the sleeve onto the pipe end, so that the pipe end is tightly gripped between the insert and the sleeve.

2. A pipe coupling comprising: a fitting including an externally grooved insert for insertion into a pipe end, and a sleeve for engagement around the pipe end into which the insert has been inserted, assembled in accordance with the method of claim 1.

* * * * *